United States Patent [19]  
Leavitt

[11] 3,880,739  
[45] Apr. 29, 1975

[54] ENZYME CATALYZED OXIDATIONS OF HYDROCARBONS

[75] Inventor: Richard I. Leavitt, Morrisville, Pa.

[73] Assignee: Mobil Oil Corporation, New York, N.Y.

[22] Filed: Jan. 4, 1973

[21] Appl. No.: 320,417

[52] U.S. Cl.................... 195/28 R; 195/49; 195/82; 195/115
[51] Int. Cl.............................................. C12b 1/00
[58] Field of Search............... 195/28 R, 51, 49, 63, 195/104–107, 108, 109; 208/308; 264/41

[56] References Cited
UNITED STATES PATENTS

| | | | |
|---|---|---|---|
| 3,344,037 | 9/1967 | Leavitt................................. | 195/49 |
| 3,567,810 | 3/1971 | Baker.............................. | 210/500 X |
| 3,740,315 | 6/1973 | Li et al................................. | 195/49 |
| 3,767,527 | 10/1973 | Coty et al......................... | 195/28 R |

*Primary Examiner*—A. Louis Monacell
*Assistant Examiner*—R. B. Penland
*Attorney, Agent, or Firm*—Charles A. Huggett; Michael G. Gilman

[57] ABSTRACT

The known oxidation of long chain normal paraffins by oxygen to oxygenated derivatives, notably aldehydes, in the presence of enzymes which are per se known to catalyze this oxidation is improved by operating in a water (enzyme phase) in oil (paraffin phase) emulsion system, adding a non-ionic surfactant; feeding enzyme which has been recovered from parent cells in the presence of paraffin; and utilizing a semipermeable membrane to separate the oil phase, including product, from the enzyme-containing water phase.

14 Claims, 1 Drawing Figure

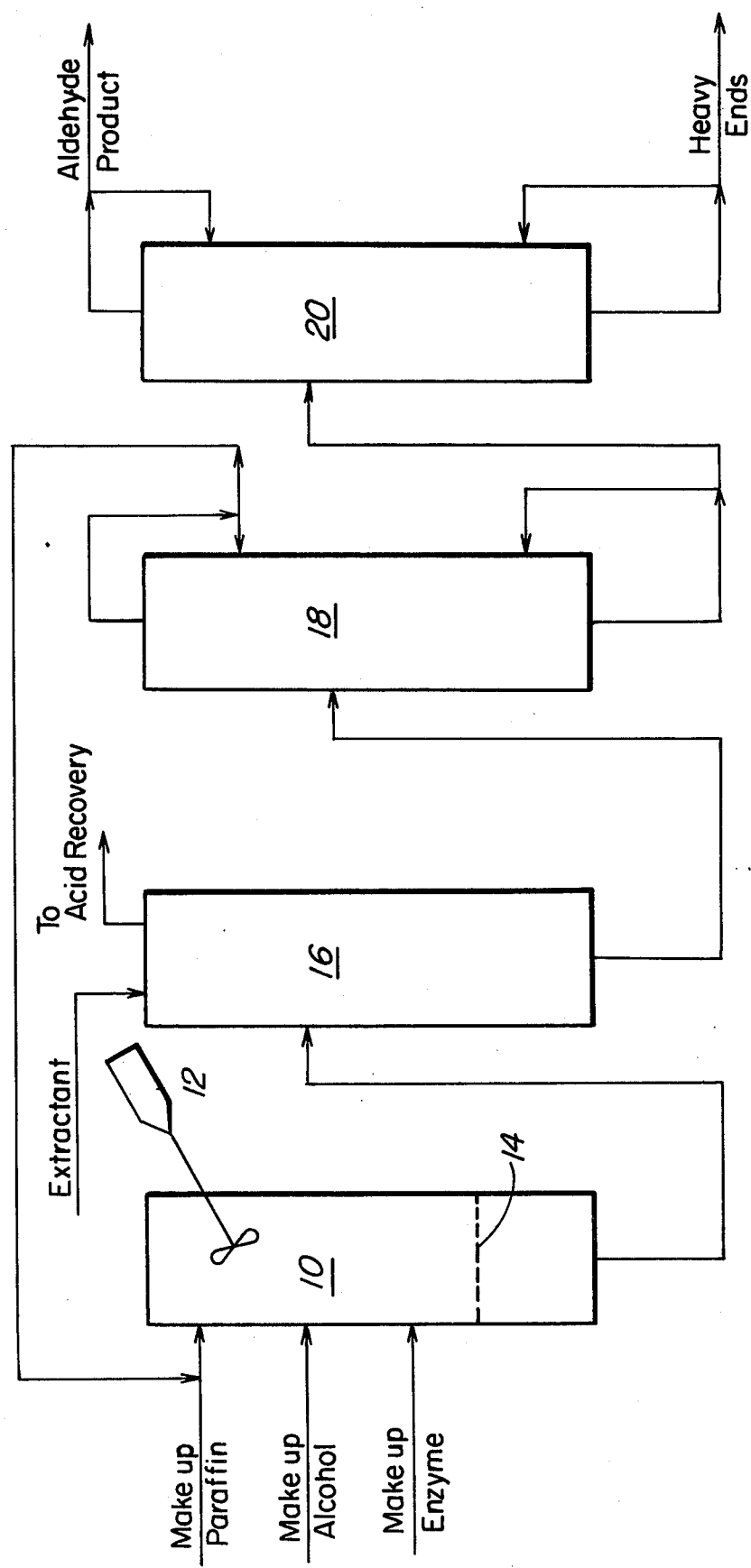

ENZYME CATALYZED OXIDATIONS OF HYDROCARBONS

This invention relates to the oxidation of organic chemical species. It more particularly refers to improvements in the oxidation of such species catalyzed by an appropriate enzyme.

It is a known phenomenon that certain enzymes have a catalytic effect upon appropriate chemical reactions. That is, it is known that, for example, the oxidation of certain species can be catalyzed by particular genera of enzymes. Many of these reactions have been carried out in the laboratory on various scales and, in some cases, the reaction parameters have been studied.

While, for some as yet unknown reason, living organisms create the proper environment for enzyme catalyzed reactions to proceed at acceptable rates, conversions and yields, man has not been able to universally provide reaction parameters for enzyme catalyzed reactions sufficient to take at least most of them out of the laboratory curiosity stage of development.

Normal paraffins are known to be metabolizable by microorganisms. This suggests that such normal paraffins can be oxidized in an enzyme catalyzed system.

This oxidation has enjoyed no practical success, however, because to date the enzymes chosen seem to possess low activity and stability.

There has been a long felt need to conduct chemical reactions with high specificity to form a desired product in good yield and in high purity so that the product can be isolated and used with a minimum of economic waste. For example, by the fundamental laws of thermodynamics, it is theoretically possible to convert normal dodecane, which is potentially inexpensive raw material isolatable in high purity from petroleum, to dodecanoic acid by oxidation with air; dodecanoic acid is a highly desirable intermediate either for biodegradable hand soaps or for edible fats. However, it is well known in the art that attempts to conduct a direct oxidation of dodecane with air invariably leads to spectrum of dozens of products in a highly intractable mixture.

Enzyme catalysts are noted for their ability in nature to induce a very wide variety of conversions with very great specificity. The two problems associated with adapting enzymes to direct chemical syntheses are the isolation of the enzyme and its retention in the reaction zone. Hypothetically, for the foregoing exemplary reaction, one might isolate one, two or three enzymes from a suitable organism which, together, might induce the conversion of dodecane to dodecanol, thence to dodecanal and finally to dodecanoic acid. In practice, however, the isolation of the minute quantities of the desired enzyme from a natural mixture thereof with numerous other enzymes, for example, is likely to prove either impossible or impractical. And yet, to attempt to use the impure enzyme mixture is likely to cause side reactions due to unwanted enzymes which destroy the desired product or induce the formation of other undesired products. It obviously would be desirable to have available a method for utilizing one, two or three desirable enzymes in admixture with other enzymes to achieve high specificity reactions, without the necessity for isolating the desirable enzymes. The second problem, namely retention of the enzymes in the reaction zone, is important because it permits the enzyme to be utilized repeatedly, which is of value considering that enzymes are, in general, costly. The art has developed to the point where this problem, in some cases, is solved by attaching the enzymes chemically to a solid porous support. Such attachment procedures, however, are difficult and usually require purified enzyme. In addition, they often result in partial or total loss of activity of the enzymes. In addition, the porous glass and/or specially prepared cellulosic supports are very costly. It would therefore be desirable to have an inexpensive method for retaining an enzyme within a reaction zone for repeated use without the necessity for attaching the enzyme to a solid support.

Hydrophobic membranes are, in general, known materials. In recent years, hydraulically permeable membranes have been prepared with very uniform pore structures. Recently, as disclosed, for example, in U.S. Pat. No. 3,567,810, it has been shown possible to prepare highly anisotropic, submicroscopically porous membranes from polymers, which membranes have good mechanical integrity and very high mass transfer capabilities. Such membrances are prepared from crystalline or glassy thermoplastic polymers, having from 5 to 50 percent crystallinity, and a glass transition temperature of at least about 20°C. Particularly advantageous polymers are those having inherently low water sorptivity, such as those having water absorptivities of less than about 10 percent by weight of moisture at 25°C and 100 percent relative humidity. These highly anisotropic membranes are suitably prepared by:

1. Forming a casting dope of a suitable polymer in an organic solvent;
2. Casting a film of said casting dope;
3. Preferentially contacting one side of said film with a diluent characterized by a high degree of miscibility with said organic solvent and a sufficiently low degree of compatibility with said polymer to effect rapid precipitation of said polymer; and
4. Maintaining said diluent in contact with said membrane until substantially all said solvent has been replaced with said diluent.

In the above procedure, the side of the film brought into contact with solvent (Step 3) forms an extremely thin microporous skin about 0.1 to 5.0 microns thick, with pore sizes in the millimicron range; the balance of the film structure becomes a support layer with very much larger pores.

The degree of anisotropy in the membrane structure is critical to achieving desired, high fluid flow characteristics while maintaining the ability of the membrane to retain high proportions of large solute molecules. That is to say that the thinner the barrier skin is and the more distinct the boundary between the barrier skin and the macroporous support layer of the membrane, the higher the performance characteristics possessed by the membrane.

While such membranes are known, and are capable of separating water and enzyme molecules by retaining the enzymes while passing water therethrough freely, membranes of this type which allow high throughputs of hydrophobic liquids, such as mineral oils, while retaining water, are not known in the art.

It is a principal object of this invention to provide a method and apparatus for selectively transforming a hydrophobic reactant to a hydrophobic product. It is a further object of this invention to provide a method for selectively enzymatically converting a hydrophobic reactant into a hydrophobic product. It is a further object of this invention to provide a hydrophobic ultrafiltration membrane with high mass transport capabilities.

Other and additional objects of the invention will be apparent to those skilled in the art from a consideration of this specification including the drawing and claims hereof.

Understanding of this invention will be facilitated by reference to the accompanying drawing which is a schematic flow sheet of the process hereof.

preferred thermoplastic polymers useful in this invention are the polysulfone-type polymers including those sold under the trade designation P 1700 by Union Carbide, Corp., and those sold under the trade designation Polymer 360 by 3M Co.

The former has a chain of phenyl groups alternating with phenyl-linking groups such as alkyl, oxygen, sulfone, to wit:

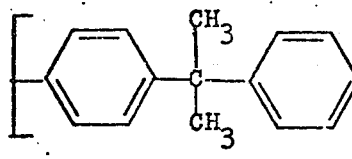 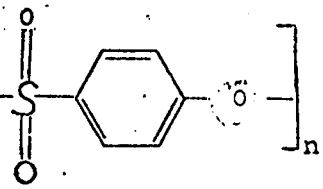

In accord with and fulfilling these objects, one aspect of this invention comprises conducting a highly selective oxidation of hydrophobic paraffins or alcohols with great specificity to aldehydes of corresponding chain lengths by use of an aqueous suspension of a crude enzyme mixture suspended or otherwise dispersed in a continuous hydrocarbon phase.

While not fully understanding the mechanism and, of course, not wishing to be bound by any particular theory of operation, it is believed that the enzyme rich aqueous phase suspended in the substantially continuous oil phase is the reaction zone. That is, it is believed that the hydrophobic reactants migrate and diffuse into the suspended aqueous droplets, react therein in contact with the enzyme catalyst and then the hydrophobic products of reaction diffuse and migrate out of the aqueous droplets into the enveloping oil phase. Thus, the reactants enter the "reaction zone" in such quantity and at such rate that they are quickly acted upon and oxidized by the enzyme system and then the products formed quickly migrate back out of the reaction zone. Both of these migrations are believed to be concentration gradient functions which operate because of the water in oil suspension system.

We have also discovered that it is possible to prepare hydrophobic ultrafiltration membranes with high mass transport rates for hydrocarbon oils for example, while retaining water or a dispersed aqueous phase on the upstream side of the membrane. Thus, by providing an apparatus with such a membrane partition, it becomes possible to retain an aqueous suspension of enzymes or other aqueous catalysts or reactants in a reaction zone while continuously passing a hydrophobic liquid, such as a mineral oil therethrough. The mineral oil may, but need not necessarily form, the continuous phase.

Polymers suitable for the preparation of the hydrophobic membranes of the present invention are those organic crystalline and/or glassy thermoplastic polymers known to the art which possess from about 5 to 50 percent by weight crystallinity as measured by X-ray diffraction techniques known to the art and/or a glass transition temperature ($T_g$) of at least about 20°C. Particularly preferred are those polymers having water absorptivities of less than about 10 percent by weight of moisture at 25°C. and 100 percent relative humidity, and a normal hexane absorptivity of less than 10 percent by weight at 25°C. in contact with saturated hexane vapor. It is understood, of course, that these absorptivities are to be measured on the dense clear polymer film, and not on the membrane of this invention, since condensation of vapors in the micropores would, in the latter case, give artificially high readings. The The latter has diphenyl and phenyl units linked by sulfone and oxygen units and an inherent viscosity of about 0.46 in a 1 percent solution of dimethyl formamide at 25°C. and an elemental analysis of C=63.2 percent, H=3.59 percent, S=13.90 percent and O=19.4 percent.

Membranes for use in this invention may be formed as follows: (Note should be taken of the fact that different polymers having different solubilities in different solvents which can be used with appropriate modifications in the set forth procedure):

The polymer, for example 15 grams of polymer 360, is dissolved in 55 C.C. of dimethyl sulfoxide solvent, conveniently at temperatures of about 50° to 80°C. but at higher temperatures where the solubility of the polymer requires and where the volatility of the solvent permits.

The resulting solution is suitably formed into a film, conveniently of from 10 to 12 mils in thickness, or as otherwise indicated, by drawing such onto a smooth glass plate with a Gardner drawdown bar. The perimeter of the plate is taped and the edges of the drawn film extend over the tape. The solution permeates the tape slightly anchoring the film thereto, thereby providing means for avoiding liquid seeping under the film during the subsequent washing, or precipitation, step.

The film is allowed to stand for a minute to smooth out any irregularities introduced during drawdown. Then the film is immersed in water at 25°C. for a period of 15 minutes after which it is removed from the glass plate as a membrane and may be cut into a suitable desired shape. At this point the membrane is hydrophilic and permits a water flux rate at 25°C. and 50 p.s.i. of about 100 gals per square foot per day.

As a variant on the above procedure, a cast film prior to immersion in water may be subject to a controlled forced evaporative step as known in the art (see U.S. Pat. No. 3,567,810). This procedure provides additional control of the anisotripic structure of the film, making it possible to increase its retention properties for large molecules without seriously reducing its hydraulic permeability for lower molecular weight fluids. It is preferred in this stage of the procedure to insure thorough washing of the film to remove residual solvents, which solvents might interfere with the next step of the treatment.

After removal from the casting substrate, the membrane, at this stage, may be mounted on a macroporous support, with the use of a suitable adhesive that will not interfere with the hydraulic permeability thereof. Suitable supports include fritted glass, glass cloth, porous polyethylene, and other such materials. Alternatively, the membrane may be processed in free form to render it hydrophobic (as will be set forth below) and then placed on a suitable porous support baking in the apparatus to be described, or mounted adhesively on a porous backing.

The mounted or unmounted membrane, which at this stage is hydrophilic, is then thoroughly dried by placing it in an oven at temperatures between about 25° and 115°C and dry air is blown through it for a period of from 1 - 20 hours. It may be steam pressure autoclaved prior to drying. The membrane is subsequently contacted with the hydrophobic liquid, which liquid should be in the molecular weight range of about 40 to 1,000, for a time and at a temperature and pressure sufficient to insure that this hydrophobic liquid fills the now dry membrane pores. Unexpectedly the thus treated membrane is found to permit high mass transport of the hydrophobic liquid while it amazingly rejects water suspended in such hydrophobic liquid.

In the usual operation of the process of this invention, aqueous solution of enzyme is vigorously shaken with an appropriately proportioned mixture of paraffin and alcohol. Oxygen is also incorporated in the reaction mixture during this vigorous shaking, from the atmosphere above the liquid portion of the mixture in batch operations. In continuous operations mechanical stirring and/or sparging air serve to mix the substantially immiscible oil and water and gaseous oxygen phases into a more or less stable dynamic emulsion.

While not wishing to be bound by any particular theory of operation, it is thought possible that the rate limiting step may be the rate of diffusion of the paraffin and/or the alcohol into the aqueous phase where it can contact the enzyme catalyst and the oxygen dissolved in this aqueous phase. If this is true, substantially increasing the proportion of oil phase relative to the water phase increases the driving force for diffusion of paraffin and/or alcohol from the oil into the water phase.

Similarly, if the paraffin and/or alcohol which has diffused into the aqueous phase is converted to alcohol or aldehyde respectively therein, and since the product is substantially more soluble in the oil phase than in the water phase, this product will tend to be leached out of the aqueous phase into the oil phase as soon as it is formed. This is believed to be so not only on the basis of solubility of the aldehyde, which is a strong driving force but also on the basis of relative concentration of the aldehyde vis-a-vis all of the other constituents in the water phase and in the oil phase. Thus, the aldehyde is leached out of the water phase substantially immediately upon its being formed, it is removed from further contact with the enzyme oxidation catalyst and the aqueous dissolved oxygen, and is therefore substantially removed from oxidizing condition in the described environment so that it is not itself further oxidized. It is believed that this accounts for the remarkably high selectivity of this process when carried out in a high oil, or even better substantially continuous oil phase system.

Reference has repeatedly been made to gas phase oxygen as the oxidizing agent in the reaction to which this invention is directed. These references are not intended to limit this invention to a mechanism of oxidation which requires the direct chemical reaction of the reactant and oxygen. It is not known, in this particular process, what the mechanism of oxidation is. It may be that there is direct chemical reaction. On the other hand it may be that the actual oxidation of the reactant is accomplished by some other chemical species in the reaction environment and that the fed oxygen replaces the utilized oxygen in this "other chemical species." In any case, and regardless of the actual reaction mechanism, oxygen must be provided to the system in a form which is available to enter into the above described oxidation but not in a form which would detrimentally affect the enzyme portion of the reaction system. It is preferred to utilize gasiform oxygen bubbled through the two phase reaction mass or shaken into admixture therewith from the gas space initially maintained over the liquid content of the reaction mass. This gasiform oxygen may be pure or substantially pure oxygen. It may be oxygen admixed with a small amount of ozone. It may be air or air enriched with oxygen. It may be oxygen with or without added ozone diluted with one or more inert gases. It is also within the scope of this invention to provide the necessary oxygen in a liquid form, such as dissolved in water, as a dilute hydrogen peroxide solution, as a dilute aqueous solution of some other oxidizing agent which is not detrimental to enzymes under the reaction conditions or the like. Where gasiform oxygen contributor is used, it may provide the agitation capability required by the system, by sparging for example and/or it may be preheated or precooled to an appropriate temperature necessary to maintain the oxidation reaction under control as desired.

The rate of feed of oxidizing agent is best considered from the point of view of available oxygen. The available oxygen is that portion of all of the oxygen (in whatever form) fed which is available for entering into the described oxidation reaction. In the embodiment of this invention set forth above, that is where a water in oil emulsion is used as the reaction medium and where a large excess of oil is present as the continuous phase, relating the amount of available oxygen to the amount of organic reactant is not too meaningful. Rather, in this case it may be more appropriate to relate the minimum quantity of available oxygen to the amount of water in the system. On this basis it is preferred to utilize sufficient oxygen input to substantially saturate the aqueous phase of the system.

It should be noted that the enzyme referred to herein as catalyzing the oxidation reactions set forth is not necessarily a single enzyme nor is it necessarily an isolated species. Further, no novelty is here urged in the selection or growth of a particular enzyme or a particular group of enzymes to catalyze one or more specific reactions. As a practical matter, a given microorganism is grown in the usual way for that particular organism, e.g., on a hydrocarbon substrate in conventional fermentation equipment. The particular organism grown is selected based upon a knowledge, from the literature or otherwise, that one or more of the myriad enzymes contained therein have the ability to catalyze the reaction which is of interest. For example, Pichia yeast cells grown on a hydrocarbon substrate contain one or more enzymes which catalyze the oxidation of long chain paraffin or alcohol to their oxygenated, suitably alcohol or aldehyde, derivatives. Other known microorganisms, possibly grown on other substrates, contain enzymes which catalyze other chemical reactions.

In any case, an appropriately chosen microorganism is conventionally grown and cells thereof are suitably harvested in a known manner. These cells are washed with water and suspended in a liquid medium suitably buffered to a pH which is appropriate for the particular organism involved. Three alternative procedures are then available for use of the contained enzymes of these cells: the cells can be ruptured, the enzymes extracted therefrom in a suitable solubilizer such as water and the aqueous solution of enzymes separated from the remaining cell fragments and used in the process of this invention; the cells can be ruptured, a solubilizer added and the entire mass, unresolved, used in the process of this invention; or the whole cells, undisrupted, can be fed into the process of this invention suspended in a suitable, perhaps aqueous, medium and used therein in an in situ ruptured or unruptured form.

In any case, it has been found to be a further aspect of this invention that the activity and the stability of the enzymes so produced is markedly improved by extracting the enzymes from their cells in a solubilizing medium which contains the substrate whose reaction will later be catalyzed by the extracted enzyme or by rupturing the cells in the reaction medium. It has been discovered that only a small proportion of reactant is necessarily present in order to achieve this improvement. Proportions of about 1 volume percent, based on the amount of solubilizer have been found to result in improved enzyme catalytic activity and stability. Preferred proportions are about 0.1 to 10 volume percent on the same basis. In particular it has been found that extracting the enzyme content of Pichia yeast cells, which have been grown on an n-tetradecane substrate, with a solubilizer, notably water buffered to a pH of about 8.0, containing a small proportion of n-tetradecane produces an aqueous enzyme product which is about twice as active as the same enzyme product produced in the same way except that no n-tetradecane was used in the extraction step.

The process of this invention works very nicely to separate and encapsulate the enzymes in the water phase and therefore to extend their life, stabilize them and generally protect them as well as possible, based on current technology, from being denatured. As noted above, whether a diffusion mechanism or an interfacial reaction mechanism is accepted, this particular format encapsulation seems to protect enzyme from shearing forces caused by stirring and/or the chemical reaction occurring which might otherwise tend to disrupt the enzyme. By this technique, the enzyme catalyst system is maintained in a mild environment buffered to the desired pH which is conductive to stability and long life.

A water soluble substrate to be reacted according to the process of this invention may best be utilized in solution or admixture with another material where this other material significantly lessens the water solubility of the substrate being reacted. Still further, it is within the purview of this invention to provide a reaction system including a continuous oil phase containing a material which is miscible with the reactant, substantially imiscible with aqueous media and substantially immiscible with the desired reaction product.

Operating in the manner described herein has been found to be quite satisfactory from a product recovery point of view. That is, a three phase substantially immiscible reaction system has been found to be quite conducive to limiting the product produced to a given desired oxidized species and has facilitated recovery thereof by initially separating the product from both the aqueous and the gas phases. Thus it is only necessary to separate the product from the reactant. This purification has been achieved by gas chromatographic methods and by a combination of liquid-liquid extraction and distillation. In the case of long chain hydrocarbon and alcohol oxidation, product may be adducted with sodium bisulfite followed by springing by treatment with a dilute base. It is within the purview of this invention to purify the reaction product mass, the oil phase recovered from the reaction mass, by many conventional techniques depending upon the composition thereof. These include fractional distillation, fractional crystallization, extraction, etc.

The primary products produced by the process of this invention can be used as such or can be subjected to further processing before or after purificaton as desired and depending upon the product mix. Alkanal products of the instant process are known to be useful as intermediates for secondary oxidation to long chain fatty acids which can be esterified to produce useful fats and plasticizers. They can also be reduced to their corresponding alcohol. Long chain alcohols and carboxlic acids have known utility in the detergent arts.

The aldehydes so produced by the process of this invention may be converted directly to esters without being removed from their paraffin solvent. They can also be conveniently oxidized or reduced in the solution in which they emerge from the process. These secondary products produced via oxidation, reduction, direct esterification, etc., can then be recovered by conventional unit operations from their paraffin solvent. In some cases, the secondary product may have a lower solubility in the paraffin solvent and therefore this secondary processing serves the dual function of converting to other products as well as resolving the reaction product mixture.

As has been noted before, one of the problems found by workers in the enzyme catalysis field is the difficult of maintaining the enzyme in a predefined reaction zone. It is only now beginning to be understood how to make a "fixed bed" catalyst of enzymes. One of the discoveries of this invention is that it is possible to effectively encapsulate enzymes and keep them in a relatively fixed reaction zone without attaching them to a solid support. While much work has been and is being done in this field of enzyme encapsulation, most of this work has approached the problem from the point of view of fixing the enzyme or enzymes to a solid substrate in some manner so as to fix their location without denaturing them.

This invention has taken a slightly different approach to this problem. According to a preferred aspect of this invention, the enzymes are effectively encapsulated by dissolving or solubilizing them in an aqueous medium which is emulsified in a continuous oil system. Thus, each droplet of water constitutes an encasement or capsule for the enzymes contained therein. Since the enzymes are not readily soluble in the oil phase to an appreciable extent if at all, the enzymes are indeed for all practical purposes, "fixed" in place.

In a batch operation, particularly where the aqueous emulsion is created and maintained at least in large part by agitation, after the reaction has been permitted to proceed for an appropriate length of time, the agitation is removed and the aqueous and oil phases separate as the emulsion breaks. The oil phase contains the products, and this is drawn off by decantation and resolved in a manner as set forth above or otherwise as the composition of the oil phase dictates.

It has been found that it can be difficult to operate this type of process in a continuous fashion because breaking the reaction zone emulsion and decantation to collect the oil phase for resolution are not unit operations which conveniently fit into a continuous process. Therefore, the discovery that certain semipermeable membranes preferably treated in a certain way, are adapted to pass oil and retain water has been most influential in establishing that the process described herein can indeed be carried out continuously. These peculiar membranes also serve the most important function of defining a reaction zone and retaining the emulsified aqueous enzyme capsules therein. Of course, while the semipermeable membrane referred to herein is most useful in continuous operation, it is also useful in batch systems to take the place of the decantation operation set forth above.

Ultra filtration membranes, semipermeable membranes, are per se well known items which are produced and marketed by many companies. It is common for such membranes to be constructed so that they will pass water yet hold back other constituents of an aqueous composition. Interestingly, such filters generally operate so as to pass smaller (in size) molecules while holding back or retaining larger molecules. This theory of operation accounts for the ability of most such membranes to pass relatively small water molecules therethrough while excluding larger, usually salt or other impurity, molecules from passage.

It has been found, according to this invention, that commercial semipermeable membranes which as purchased are intended to and do indeed pass water and aqueous solutions with small solute molecules can be used in the process of this invention in order to separate the active enzymes from the reaction zone and permit the remaining oil phase to be resolved. Much more importantly, it has been found that it is possible to treat these commercial water permeable membranes as aforesaid to convert them to water retaining membranes which are capable of passing oil preferentially. This is most surprising since if the size of the molecule is determinative of what is passed, one would think that in an oil-water system, water, being smaller in molecular size than oil, would always preferentially pass through such filter membrane.

It is not known exactly why the treatment described above converts a water permeable/oil impermeable filter membrane into an oil permeable/water impermeable filter membrane. It is similarly not known what the mechanism of filtrate passage through the filter is. However, regardless of the mechanism involved, it is a fact that filter membranes treated as described above do indeed behave as described. This is a very fortunate thing because it permits the process of this application to be carried out continuously while retaining the enzyme catalyst "encapsulated" in the reaction zone, that is upstream of the filter membrane.

One particular illustrative embodiment of this invention is depicted in the accompanying drawing. In the depicted embodiment, a mixture of long chain normal paraffin and long chain normal alcohol are fed to a reactor 10 in sufficient quantity to make an oil phase containing about 10 volume percent alcohol. Enzyme is extracted from appropriate microorganism growth in a water solution or suspension and, mixed with a small amount of surfactant, fed to the reactor 10. Stirring means 12 is provided in the reactor. The reactor may be provided with heat transfer means (not shown) if desired, as is conventional chemical reactor construction technology. The down stream end of the reactor 10, or reaction zone, is a hydrophobic membrane 14 which permits passage of the oil, or organic, phase portion of the contents of the reactor and retains the aqueous portion of the reaction mass in the reaction zone. The oil passing through the filter 14 is composed predominantly of n-paraffin reactant, n-alcohol and n-aldehyde product. A typical product resolution scheme is set forth including a liquid-liquid extraction means 16 for separating any dissolved gases and/or non-organic components and/or carboxylic acids in the product which might have passed through the filter 14; a first distillation column 18 for recovering n-paraffin for recycle; and a second distillation column system 20 for recovering and resolving the oxidation products free from heavy ends contamination.

This invention will be illustrated by the following Examples which are non-limiting. Parts and percentages are by weight unless expressly stated to the contrary.

EXAMPLE 1

Pichia yeast cells were grown in a fermenter on a predominantly long chain paraffin hydrocarbon substrate, harvested therefrom, washed and suspended in an aqueous medium in a concentration of 5 grams in 75 ml buffered to a pH of 8.0. The cells were ruptured by treatment with ultrasonic vibration, centifuged to separate out the cell fragments and an aqueous system of the enzyme portion thereof established at a concentration of 10 mg of protein per ml of aqueous system.

Several runs were made by admixing the aqueous solubilized enzymes and a 10 percent solution of n-tetradecanol in n-tetradecane in varying proportions to a total of 50 parts by volume. The oxidation reactions were carried out by shaking the reactors for 2 hours at 34°C. Products were recovered as aforesaid and analyzed by gas chromatography. The following correlation of proportion of oil changed to aldehyde formed was observed:

| n-tetradecanol dissolved in n-tetradecane | n-tetradecanal produced |
|---|---|
| 5 vol % | 0.9 g/liter |
| 15 vol % | 1.5 g/liter |
| 50 vol % | 2.8 g/liter |

These data substantiate the advantages of operating in a high oil system. Radioactive data demonstrated that most of the aldehyde was derived from the alcohol and that a small portion (2 percent) was derived from the hydrocarbon.

EXAMPLE 2

Pichia yeast cells were grown, harvested, ruptured and solubilized as in Example 1. The oxidation system was carried out by admixing solubilized aqueous enzyme with n-tetradecane having 10 percent n-tetradecanal dissolved therein. The proportion of these constituents fed was 1 part by volume oil and 19 parts by volume of aqueous components. The reaction mixture was shaken together with an air atmosphere as aforesaid for 2 hours at 34°C. In this reaction mass, an oil in water emulsion was formed. After the reaction was completed, the reaction product was resolved and analyzed by gas chromatographic techniques. The product contained 1.7 parts of tetradecanal per part by weight of enzyme fed and 0.5 parts of a $C_{12}$ alcohol per part by weight of enzyme.

EXAMPLE 3

Example 2 above was repeated except that 13 parts by volume of oil and 7 parts by volume of aqueous enzyme component were admixed and shaken to form a water in oil emulsion. Product analysis indicated that 3 parts of n-tetradecanal were produced per part by weight of enzyme fed and that 1.5 part by weight of $C_{12}$ alcohol were obtained per weight part of enzyme fed.

This Example indicates that although an oil in water emulsion is certainly operative in the process of this invention (See Example 2), a water in oil emulsion gives total product yields which are about twice as high on the same basis and gives a yield of desired aldehyde product which is about 43 percent higher than an oil in water emulsion on the same basis.

EXAMPLE 4

Pichia yeast cells were grown, harvested, ruptured and solubilized as set forth in Example 1 to produce an aqueous composition containing 12 parts by weight of protein per part by volume of aqueous composition. The reaction mixture was sufficient aqueous composition to contribute 60 parts by weight of protein (that is 5 parts by volume of aqueous composition) and 40 parts by volume of n-tetradecane containing 10 weight percent n-tetradecanol dissolved therein. There was further included various parts by volume of an ethoxylated phenol adduct non-ionic surfactant as indicated in the following Table. Note that the oxidation reaction was carried out at 34°C by shaking the reaction mass for the times indicated in the Table.

EXAMPLE 5

Pichia yeast cells were grown, harvested, washed and solubilized in water, buffered to pH of 8 and separated into 2 aliquots of 5 grams of cells and 75 ml of water each. To one of the aliquots was added 1 ml of n-tetradecane. Both aliquots were then subjected to ultrasonic cell rupture followed by centrifugation to produce aqueous reaction components as set forth in previous Example 1. The feedstock of oil to the reaction in each case was 1 part by volume of n-tetradecane containing 10 percent dissolved n-tetradecanol and the aqueous feed was 19 parts by volume. The reaction mixtures were shaken at 34°C for 8 hours and the products produced from each analyzed by gas chromatography. These data indicated that the total oxygenated product (alcohol, aldehyde and/or acid) produced in the system which used cells ruptured in the presence of n-tetradecane was about 43 percent (1.5 mg per mg of enzyme) higher than the total oxygenated product produced in cells ruptured in the presence of n-tetradecane (0.86 mg per mg of enzyme).

EXAMPLE 6

Example 3 was repeated except that the proportion of oil to water was 13 to 2, the reaction zone was pressurized and one end of the reaction zone had an ultra filtration membrane, treated to pass oil and retain water, across it so that the pressure exerted on the reaction mixture (by compressed air) tended to force the reactant and product through the filter. It was found that operating under pressure did not adversely affect the reaction but did affect the flow rates through the membrane, which ranged from 0.2 to 4.4 ml per min for a membrane of $mm^2$ surface area at pressures of 1 to 20 psig respectively.

One specific filter which was used to good effect was commercially available and purchased from the Amicon Co. under the product designation PM 30, 62

TABLE I

| RUN | TOTAL TIME (HRS.) | SURFACTANT VOL. % | REACTION RATE $K_o$ WEIGHT OF ALDEHYDE PER HR PER WEIGHT OF ENZYME | ENZYME HALF LIFE (HRS.) | N-TETRADECANAL PRODUCT (PART BY WEIGHT PER PART BY VOLUME OF OIL) |
|---|---|---|---|---|---|
| a | 2 | 0 | 1.12 | 3.09 | 1.2 |
| b | 4 | 0 | 1.12 | 3.09 | 4.6 |
| c | 8 | 0 | 1.12 | 3.09 | 7.0 |
| d | 21 | 0 | 1.12 | 3.09 | 9.0 |
| e | 2 | 0.01 | 1.12 | 3.84 | 1.9 |
| f | 4 | 0.01 | 1.12 | 3.84 | 5.4 |
| g | 8 | 0.01 | 1.12 | 3.84 | 8.9 |
| h | 21 | 0.01 | 1.12 | 3.84 | 10.1 |
| i | 2 | 0.1 | 1.38 | 4.82 | 3.0 |
| j | 4 | 0.1 | 1.38 | 4.82 | 8.0 |
| k | 8 | 0.1 | 1.38 | 4.82 | 12.1 |
| l | 21 | 0.1 | 1.38 | 4.82 | 14.9 |
| m | 2 | 1.0 | 1.98 | 5.52 | 4.6 |
| n | 4 | 1.0 | 1.98 | 5.52 | 9.7 |
| o | 8 | 1.0 | 1.98 | 5.52 | 18.3 |
| p | 21 | 1.0 | 1.98 | 5.52 | 20.6 |

These data clearly show that while the presence surfactant is not essential to the practice of the process of this invention, see runs a through d, the presence of surfactant improves reaction rate, enzyme half life and aldehyde yield, all most desirable matters.

mmD. This filter was water washed to remove residual glycerol present, washed again in 50 percent 2-propanol; autoclaved at 15 lbs for 15 minutes and then dried at 25°C for 17 hours while passing air therethrough at 660 mm pressure difference across the membrane. This dried membrane was soaked in n-tetradecane and then used as aforesaid to pass oil and retain water. Several tests were conducted to determine the effect, if any, of surfactant on the separation properties of this membrane. These tests were conducted by filtering an emulsion of 10 ml of n-tetradecane in 100 ml of aqueous enzyme to which was added 0.1 percent polyphenoxy ether emulsifier (Igepol 520) at a vacuum of 100 mm Hg A. The emulsifier did not interfere with the selective passage of oil, i.e., no water passed through.

What is claimed is:

1. In the oxygen oxidation of a hydrophobic reactant comprising at least one paraffin, or partially oxygenated derivative thereof, by contacting oxygen, said hydrophobic reactant and an aqueous system containing at least one enzyme capable of catalyzing this oxidation under reaction conditions sufficient to support said oxidation; the improvement which comprises providing as a reaction mass said hydrophobic reactant in a continuous hydrophobic phase and said enzyme in a discontinuous aqueous phase enveloped by said continuous hydrophobic phase; providing a hydrophobic phase permeable-aqueous enzyme solution impermeable semi-permeable membrane; contacting said reaction mass with said semi-permeable membrane under such temperature and pressure conditions as to pass said hydrophobic phase containing said higher oxygenated derivative product therethrough; and recovering said higher oxygenated derivative from said passed hydrophobic phase.

2. The improved process claimed in claim 1 wherein said hydrophobic reactant phase includes a normal alcohol of about 12 to 18 carbon atoms and said oxygenated derivative is a $C_{12}$ to $C_{18}$ normal alkyl aldehyde.

3. The improved process claimed in claim 2 wherein the principal aldehyde product corresponds in chain length and configuration to said alkanol.

4. The improved process claimed in claim 3 wherein said hydrophobic reactant phase includes said alkanol and a paraffin of the same chain length.

5. The improved process claimed in claim 4 wherein said paraffin is n-tetradecane, said alcohol is n-tetradecanol and said aldehyde is n-tetradecanal.

6. The improved process claimed in claim 1 carried out continuously.

7. The improved process claimed in claim 1 wherein said enzymes are derived from Pichia yeast cells.

8. The improved process claimed in claim 1 wherein said reactant comprises a paraffin and said product comprises an oxygenated derivative thereof, and wherein said aqueous enzyme solution is substantially immiscible with said paraffin reactant and said oxygenated derivative thereof.

9. The improved process claimed in claim 1 wherein the reaction mass comprises an emulsion of said aqueous enzyme phase in said hydrophobic reactant phase.

10. A process as claimed in claim 1 including recycling unreacted portions of said hydrophobic reactant phase.

11. A process as claimed in claim 1 wherein said semi-permeable membranes comprises a thermoplastic polymer having about 5 to 50 percent crystallinity, a glass transition temperature of at least about 20°C and a water absorptivity of less than about 10 percent at 25°C and 100 percent relative humidity, and wherein said membrane has been dried and had its pores filed with a hydrophobic liquid prior to use in said process.

12. A process as claimed in claim 1 including providing a surfactant in the reaction system.

13. A process as claimed in claim 1 including agitating the reaction system.

14. The improved process of claim 1 wherein said continuous hydrophobic phase contains a material which is miscible with said organic compound.

* * * * *

UNITED STATES PATENT AND TRADEMARK OFFICE
CERTIFICATE OF CORRECTION

PATENT NO. : 3,880,739
DATED : April 29, 1975
INVENTOR(S) : Richard I. Leavitt

It is certified that error appears in the above-identified patent and that said Letters Patent are hereby corrected as shown below:

Column 5, line 2       "baking" should be --backing--

Column 11, Table 1, Run B   numbers across should read
--4--0--1.12--3.09--4.6--
not "4-01.12-3.09-4.6"

Signed and Sealed this twenty-first Day of October 1975

[SEAL]

Attest:

RUTH C. MASON
Attesting Officer

C. MARSHALL DANN
Commissioner of Patents and Trademarks